United States Patent
Achtari et al.

(10) Patent No.: US 9,867,044 B2
(45) Date of Patent: *Jan. 9, 2018

(54) METHOD AND APPARATUS FOR SECURITY CONFIGURATION AND VERIFICATION OF WIRELESS DEVICES IN A FIXED/MOBILE CONVERGENCE ENVIRONMENT

(71) Applicant: Apple Inc., Cupertino, CA (US)

(72) Inventors: Guyves Achtari, Ottawa (CA); Denis Plante, Ottawa (CA); Eric Bernier, Ottawa (CA)

(73) Assignee: Apple Inc., Cupertino, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/098,463

(22) Filed: Apr. 14, 2016

(65) Prior Publication Data

US 2016/0234729 A1 Aug. 11, 2016

Related U.S. Application Data

(63) Continuation of application No. 12/017,181, filed on Jan. 21, 2008, now Pat. No. 9,319,879.

(Continued)

(51) Int. Cl.
*H04W 12/06* (2009.01)
*H04L 29/06* (2006.01)
(Continued)

(52) U.S. Cl.
CPC ............ *H04W 12/06* (2013.01); *G06F 15/16* (2013.01); *G06F 21/35* (2013.01);
(Continued)

(58) Field of Classification Search
CPC ... H04L 63/20; H04L 63/164; H04L 63/0876; H04W 12/06; H04W 12/08; H04W 12/12; G06F 21/35
See application file for complete search history.

(56) References Cited

U.S. PATENT DOCUMENTS 6,038,444 A 3/2000 Schipper et al.
6,230,012 B1 5/2001 Willkie et al.
(Continued)

OTHER PUBLICATIONS

Sandeep Adwankar, Sangita Mohan and V. Vasudevan, "Universal Manager: seamless management of enterprise mobile and non-mobile devices," IEEE International Conference on Mobile Data Management, 2004. Proceedings. 2004, 2004, pp. 320-331.*

(Continued)

*Primary Examiner* — Karl Schmidt
(74) *Attorney, Agent, or Firm* — Meyertons, Hood, Kivlin, Kowert & Goetzel, P.C.

(57) ABSTRACT

A system and method is described that enables autonomic discovery of wireless network security mechanisms by mobile devices. Stateful monitoring of wireless devices facilitates identification of pending network connectivity loss, enabling a handoff server to proactively advertise new points of access and their associated security mechanisms to devices before connectivity is lost. As a result, devices may seamlessly transition between secure networks. Stateful monitoring of device reachability may be used together with device certificates and/or tokens to decrease the potential of MAC spoofing and further secure the network. Stateful monitoring of device connectivity status during network transitions facilitates the identification of rogue access points. The token or certificate on the device may be used to authenticate the device while transitioning between networks by a centralized entity, managing the initiation and the execution of the handover for the device.

20 Claims, 5 Drawing Sheets

Related U.S. Application Data

(60) Provisional application No. 60/940,800, filed on May 30, 2007.

(51) Int. Cl.

| | | |
|---|---|---|
| *G06F 15/16* | (2006.01) | |
| *G06F 21/35* | (2013.01) | |
| *H04W 36/00* | (2009.01) | |
| *H04W 12/08* | (2009.01) | |
| *H04W 12/12* | (2009.01) | |

(52) U.S. Cl.
CPC ........ *H04L 63/0876* (2013.01); *H04L 63/164* (2013.01); *H04L 63/20* (2013.01); *H04W 12/08* (2013.01); *H04W 36/0038* (2013.01); *H04W 12/12* (2013.01)

(56) References Cited

U.S. PATENT DOCUMENTS

| | | | |
|---|---|---|---|
| 6,886,102 B1 | 4/2005 | Lyle | |
| 7,042,988 B2* | 5/2006 | Juitt | H04L 1/22 370/329 |
| 7,079,843 B2 | 7/2006 | Iacono et al. | |
| 7,546,125 B2 | 6/2009 | Sharma et al. | |
| 7,889,663 B1 | 2/2011 | Wright et al. | |
| 8,042,147 B2* | 10/2011 | Byres | H04L 41/0806 713/164 |
| 8,782,786 B2 | 7/2014 | Baccas et al. | |
| 2002/0068565 A1 | 6/2002 | Purnadi et al. | |
| 2002/0114469 A1* | 8/2002 | Faccin | H04L 9/3271 380/270 |
| 2003/0100307 A1 | 5/2003 | Wolochow et al. | |
| 2004/0003285 A1 | 1/2004 | Whelan et al. | |
| 2004/0090937 A1* | 5/2004 | Chaskar | H04W 36/0011 370/331 |
| 2004/0137901 A1 | 7/2004 | Hamasaki et al. | |
| 2005/0090259 A1 | 4/2005 | Jain et al. | |
| 2005/0202823 A1 | 9/2005 | Shaheen et al. | |
| 2006/0166127 A1* | 7/2006 | Itami | G03G 15/09 430/122.8 |
| 2006/0258358 A1 | 11/2006 | Kallio | |
| 2006/0268711 A1 | 11/2006 | Doradla et al. | |
| 2006/0274695 A1 | 12/2006 | Krishnamurthi et al. | |
| 2007/0002811 A1 | 1/2007 | Faccin et al. | |
| 2007/0026866 A1 | 2/2007 | Krishnamurthi et al. | |
| 2007/0058601 A1 | 3/2007 | Davis et al. | |
| 2007/0091848 A1 | 4/2007 | Karia et al. | |
| 2007/0204155 A1* | 8/2007 | Dutta | H04L 63/062 713/168 |
| 2007/0213033 A1 | 9/2007 | Alper et al. | |
| 2007/0249291 A1 | 10/2007 | Nanda et al. | |
| 2007/0280202 A1 | 12/2007 | Hamel et al. | |
| 2008/0198811 A1 | 8/2008 | Deshpande et al. | |
| 2008/0205339 A1 | 8/2008 | Brophy | |
| 2010/0106786 A1* | 4/2010 | Horstmann | G06Q 10/107 709/206 |

OTHER PUBLICATIONS

Spyrou, Constantinos, et al. "Mobile agents for wireless computing: the convergence of wireless computational models with mobile-agent technologies." Mobile Networks and Applications 9.5 (2004): 517-528.*

Sun et al., "Secure and fast handover scheme based on pre-authentication method for 802.16/WIMAX infrastructure networks", TENCON, 2007 IEEE Region 10 Conference, 4 pages, IEEE, 2007.

Sethom et al., "A distributed and secured architecture to enhance smooth handoffs in wide area wireless IP infrastructures", ACM SIGMOBILE Mobile Computing and Communications Review 10.3, 2006, p. 46-57.

* cited by examiner

METHOD AND APPARATUS FOR SECURITY CONFIGURATION AND VERIFICATION OF WIRELESS DEVICES IN A FIXED/MOBILE CONVERGENCE ENVIRONMENT

PRIORITY CLAIM

This application is a continuation of U.S. patent application Ser. No. 12/017,181, filed Jan. 21, 2008, entitled "Method and Apparatus for Security Configuration and Verification of Wireless Devices in a Fixed/Mobile Convergence Environment", which claims benefit of U.S. Provisional Application No. 60/940,800, filed May 30, 2007, the entirety of which are incorporated herein by reference.

FIELD OF THE INVENTION

The present application relates generally to the field of wireless networking and more particularly to a system and method for forwarding security configuration to mobile device to reduce delays associated with transitioning between different networks.

BACKGROUND OF THE INVENTION

Handheld wireless devices are essentially hand held radios that communicate by exchanging radio frequency signals with network access points using predefined signaling protocols. Each handheld device may include multiple interfaces for communicating using a variety of different wireless networks. A typical handheld wireless device is a mobile phone which includes a cellular interface that allows the phone to connect to a Public Switched Telephone Network (PSTN) via a cellular network such as a Global System for Mobile Communications (GSM) network. A handheld device may also include interfaces that allow the device to communicate using General Packet Radio Service (GPRS) protocols in a GPRS network, Wi-Fi (IEEE 802.11) protocols in a Wi-Fi network, WiMAX (IEEE 802.16) protocols in a WiMAX network or Bluetooth protocols for Bluetooth exchanges. The different wireless networks (Wi-Fi, WiMAX, etc.) are interconnected via gateways, where a gateway is a node on a network that serves as an entrance to another network. Wireless access points or base stations transmit radio frequency signals to indicate the existence of a wireless network to a wireless device. A wireless device will associate (or connect) with one of the wireless access points or base stations at a network point of access to gain access to the wireless network. Once the wireless device has made a connection to a wireless network, the wireless device may access resources in the wireless network, as well as resources in networks connected to the wireless network via gateways.

Radio frequency signals, however, have a limited transmission range and when a mobile device moves it may move out of range of the access point or base station that connects it to the desired resource. In order to maintain resource access, the mobile device must connect to another access point or base station. The access point or base station may be part of administrative domain associated with the prior network or may be a network associated with a different administrative domain.

Many enterprise networks are protected from unauthorized access using various Network Access Control (NAC) mechanisms, such as 802.1x and security mechanisms such as Virtual Private Networks (VPNs), keying mechanisms and the like. For example, within certain enterprise domains the wireless data network is protected by an IPSEC VPN gateway. Some access points are protected with different standard security mechanisms, such as WEP, WEP2, 802.1x, etc.

In order to gain access to such networks, users must have prior knowledge of the type of security mechanism used by the network. Security mechanisms may be found at multiple layers of then network stack. For example, layer two may have an 802.11 security mechanism, layer 3 may have an IPSEC mechanism, layer 7 may have a user authentication mechanism, etc. Information regarding the particular security mechanisms used at each network layer is frequently provided in text form or as a downloadable client to the authorized users by a network administrator when the mobile device is initially delivered to the authorized users.

Because security mechanisms differ between networks, mobile users who transition between networks may have their communication interrupted as they transition between secured networks. As a network device attempts to connect to a new network, it initiates connections using various, known security mechanisms one by one until the correct security mechanism is, by chance, detected and the connection is allowed. It would be desirable to increase convergence time by reducing delays associated transitions between secure networks.

SUMMARY OF THE INVENTION

According to one aspect of the invention a system and method is provided that enables autonomic discovery of wireless network security mechanisms by mobile devices. Wireless devices that come within range of secure wireless networks are selectively delivered information associated with the security mechanisms of the secure network. Such an arrangement permits seamless transition of a device between secure networks. In addition, pre-authentication of the device may be used to expedite network transitions while ensuring that the security of the networks is not compromised.

According to one aspect of the invention, the system includes at least one anchor point associated with an administrative domain, an Information Server coupled to or within the administrative domain and at least one domain device, where the device associated with the administrative domain (hereinafter a domain device). The Information Server (IS) is provisioned with configuration information and security methods for a variety of different administrative domains. The anchor point of a given administrative domain uses information from the IS to initiate, control and actively perform stateful monitoring of the domain devices and their transitions between different networks both within and external to the domain. As will be described in more detail below, such an arrangement allows the anchor point to increase the speed with which domain devices are coupled to domain networks while securing domain networks against access by unauthorized devices, precluding connection of domain devices to insecure networks and rapidly identifying when domain devices have become compromised.

These and other features of the present invention will be described in greater detail with regard to the attached figures.

DETAILED DESCRIPTION

As mentioned above, the present invention is directed at a system and method for a Media Independent Handoff (MIH) security configuration service that enables autonomic discovery of wireless network security mechanisms by mobile devices. The security configuration service selectively delivers information associated with security mechanisms of a network to a mobile device prior to handoff of the mobile device from a source network to the secure destination network. The information may include one or more identifiers of the type(s) of security mechanism used by the network, or may include information sent to a thin client or middleware on the mobile device to enable the security mechanism at the device. With such an arrangement mobile devices may transition between networks (both fixed and wireless) that are differently secured without interruption of connectivity.

Figure 1:
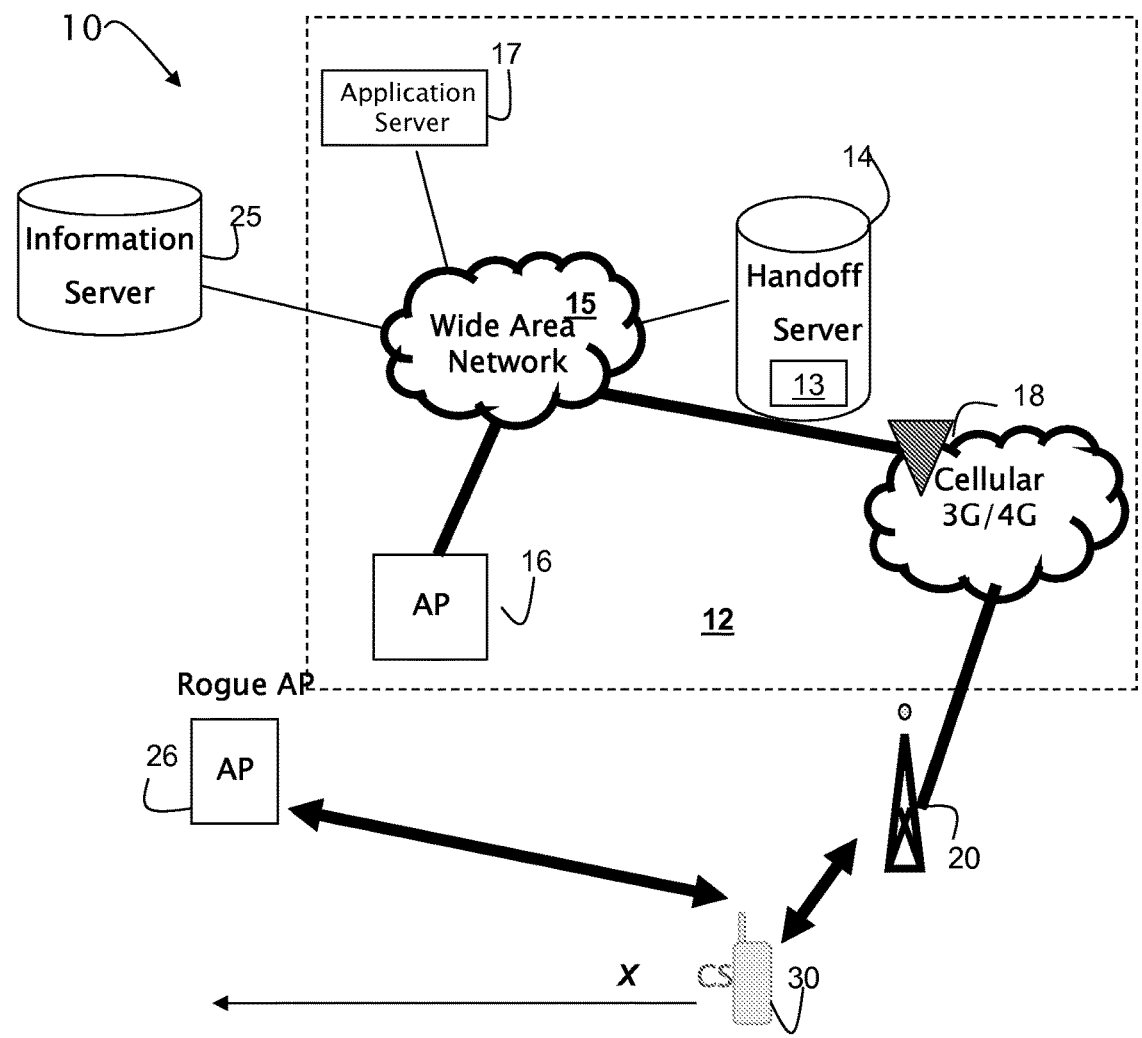
FIG. 1 is a block diagram of an autonomic security mechanism discovery system of the present invention.
Figures 2A, 2B:
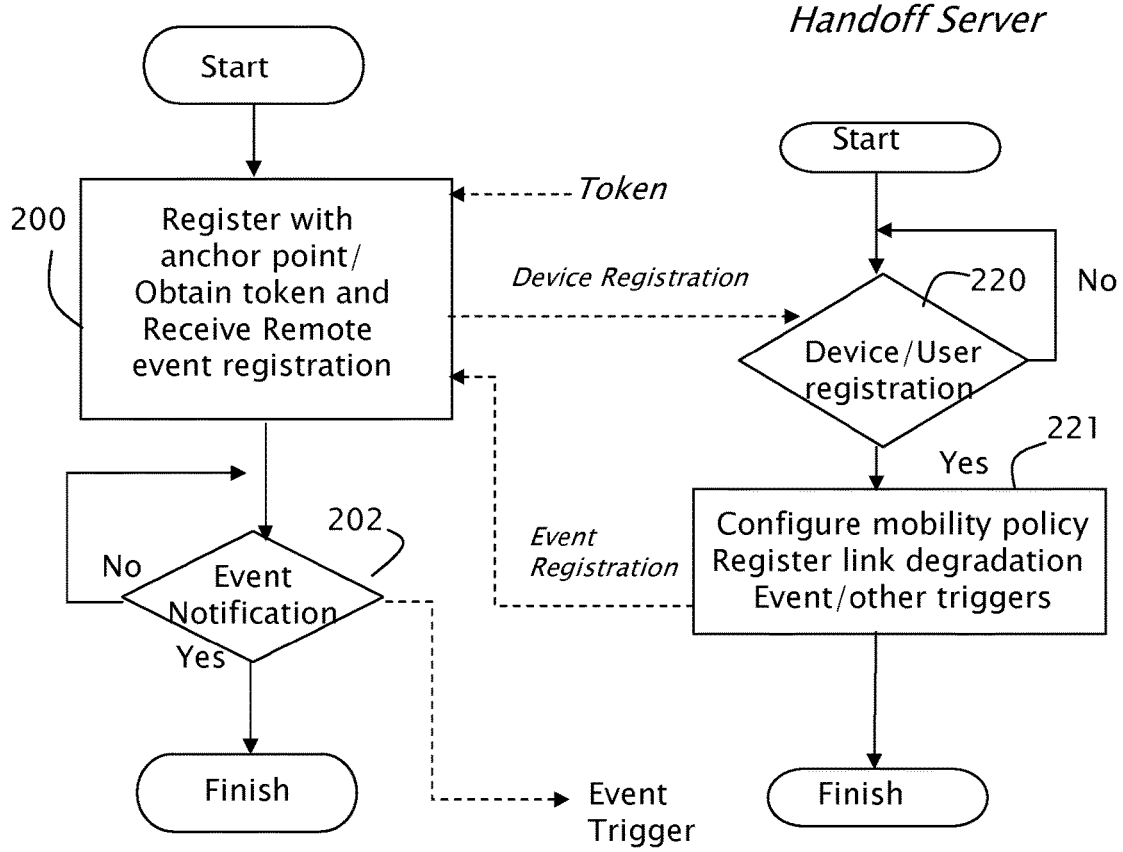
FIGS. 2A and 2B are flow diagrams provided to illustrate various steps performed by a domain device and a handoff server during registration of the domain device.

FIG. 1 illustrates exemplary components that may be included in a system 10 that supports a media independent handoff (MIH) security configuration service of the present invention. Exemplary components that may be included in an administrative domain of the present invention include one or more wireless network access points such as access point 16, application servers 17 such as voice over IP systems, and conferencing servers and the like. The components may be coupled via a Wide Area Network (WAN) 15, which includes wireless and wireline capabilities, as well as a cellular network 18 which may be coupled to one or more cellular base stations such as base station 20.

A domain device, such as device 13, may access the administrative domain via one or both of the wireless points of access 16 and 18 depending upon the configuration of the domain device. For the purpose of this application a domain device is a mobile device authorized to access one or more networks of an administrative domain. For example, a domain device may be a telephone or laptop computer of employees of an enterprise. The domain device may be dual mode or single mode; the present invention is not limited to devices having any particular capabilities.

According to one aspect of the invention, an administrative domain supporting the present invention includes an anchor point, which in FIG. 1 is handoff server 14. As will be described in more detail below, the handoff server 14 initiates, executes and then further verifies proper transition of domain devices between networks both within and external to the administrative domain. As part of initiating the transition of a domain device between networks, the handoff server evaluates potential points of access to the network for the domain device based on the current state of the domain device to select the optimum point of access for a domain device that protects the network. In addition the handoff server thus performs stateful monitoring of all domain devices. The stateful monitoring performed by the handoff server 14 serves a variety of purposes: stateful monitoring is used to identify impending network transitions to enable advertising of desired points of access and associated security methods to the domain device prior to network transition. In addition, stateful monitoring is used to protect the networks of the domain by active monitoring of the connectivity state of domain devices to ensure that they behave as anticipated. With such an arrangement, the handoff server can protect the network from exposure to rogue access point.

As will be described in more detail later herein, a further advantage of the stateful monitoring performed by the handoff server is its ability to protect the network against MAC spoofing. MAC spoofing occurs when a rogue device monitors communications between a domain device and a network, and essentially impersonates the domain device by 'stealing' its MAC address to connect to the network. The stateful monitoring performed by the handoff server monitors the location or reachability of each domain device. As will be described in more detail below, the reachability information may be used in conjunction with token verification during a two step authentication process that further protects the network.

In one embodiment the handoff server includes or is coupled to a data repository 13 which stores various state information associated with the domain devices. The information includes but is not limited to reachability information, a Media Access Control (MAC) address of domain devices and routing information associated with domain devices, including, for example, Secure System Identifier (SSIDs) associated with network coupled to be each domain devices.

The handoff server operates in response to a plurality of configurable event triggers. The handoff server registers events on the domain devices to identify configurable event triggers. The configurable event triggers may be associated with various states of the domain devices and may include, application changes, link degredation, discovery of a new network interface, or the occurrence of a reportable event. Upon receipt of the event trigger, should the handoff server determine that the domain device should transition to a new network, the handoff server accesses an Information Server 25.

The Information Server is a database which stores security methods and configuration information associated with each known network. As described in 802.21, an Information Server typically stores all the configuration information associated with all known networks, and may be used to provide suggested network links during Media Independent Handoff (MIH) as described in IEEE 802.21. The IS thus facilitates both homogeneous handovers within a single network, as well as heterogeneous handovers across different networks to provide global mobility. According to one aspect of the invention, the IS is augmented to also store, for each network, security configuration information, including security profiles and parameters that enable access to the secure networks. Storing the security information together with the network information in the IS enables security mechanisms to be advertised to authorized mobile devices prior to connection establishment, thereby increasing allowing security processing to be handled in advance and reducing delays associated with transitioning between networks. The IS may include pointers to additional software required for the network access, and includes contains the appropriate messaging to retrieve security configuration.

Should the handoff server, in response to event triggers, determine that a domain device should transition to a new network, the handoff server forwards a request to the IS to obtain network information. For example, assuming in FIG. 1 that the domain device 13 is moving in the direction indicated by arrow X. The domain device forwards an event indication that is it losing transmission power to the Handoff server via the cellular network 18. The handoff server 14, in response to the event, gathers other information regarding the network, and, if it determines that a new link is needed for the device, it queries the IS 25 for a list of networks, based on cost, location, etc. The handoff server selects one of the links, forwards the point of attachment information and security configuration information to the domain device, and command the device to connect to the new point of attachment. If the list of new links includes only undesirable points of attachment (for example, on networks that are not recognized or authorized by the handoff server) the handoff server may continue requesting points of attachment from the IS until an approved point of attachment is obtained.

Once the approved point of attachment is identified, the handoff server forwards the point of attachment information as well as any security configuration information to the domain device to enable the device to securely connect with the network. The security configuration information may be forwarded to a thin client or middleware on the domain device.

In an alternate embodiment the handoff server may act as a security proxy for the domain device. The handoff server may act as a security proxy for a variety of reasons, including but not limited to situations where the domain device does not have the capability to support a security mechanism.

The handoff server may rely on the token or certificate described in more detail below to authenticate the domain device while acting as a gateway that further encrypts data, or builds a VPN tunnel, as required to access the secure network. Such an arrangement reduces the need to provide complex security mechanisms on trusted domain devices.

Once the handoff server has forwarded the information to the domain device to enable the domain device to establish a new, secure connection, the handoff server actively monitors the transition of the domain device between networks. Should the device fail to transition as or when expected, the handoff server can quarantine the domain device to protect the administrative domain.

For example, referring now to FIG. 1, a domain device 13 moving in direction X may indicate to the IS that it is losing connectivity. In response, the IS may provide information to allow the domain device to access the enterprises' wireless network, for example by providing the MAC address for AP 16, as well as the SSID of the network and VPN tunneling information. The handoff server will monitor the enterprise network for the entrance of the domain device. However, in a situation where a rogue AP is in the area, the domain device may incorrectly associate with AP 26.

If the domain device does not enter the wireless network within a desired time period after receiving the network information, there is the potential that the domain device was compromised by the rogue AP. In such situations, the handoff server can quarantine the domain device, by refusing future connections to the administrative domain.

FIGS. 2-6 are flow diagrams which illustrate exemplary message flow between each of the domain device, handoff server and Information Server. FIGS. 2A and 2B illustrate message flow during domain device registration with the handoff server. FIGS. 3-6 illustrate exemplary steps that may be performed in the security configuration service of the present invention.

At step 200 (FIG. 2A) the domain device registers with the anchor point/handoff server. As part of the registration process, the domain device may obtain a token or certificate, for example from a third party certification authority. The token or certificate can be used to authenticate the particular domain device and is stored on the domain device.

As part of the registration process of the domain device, at step 221 the handoff server registers particular events with the domain device. The occurrence, or triggering of these events at step 202 results in event trigger notifications to the handoff server. The present invention is not limited to the use of any particular event triggers.

Figure 3:
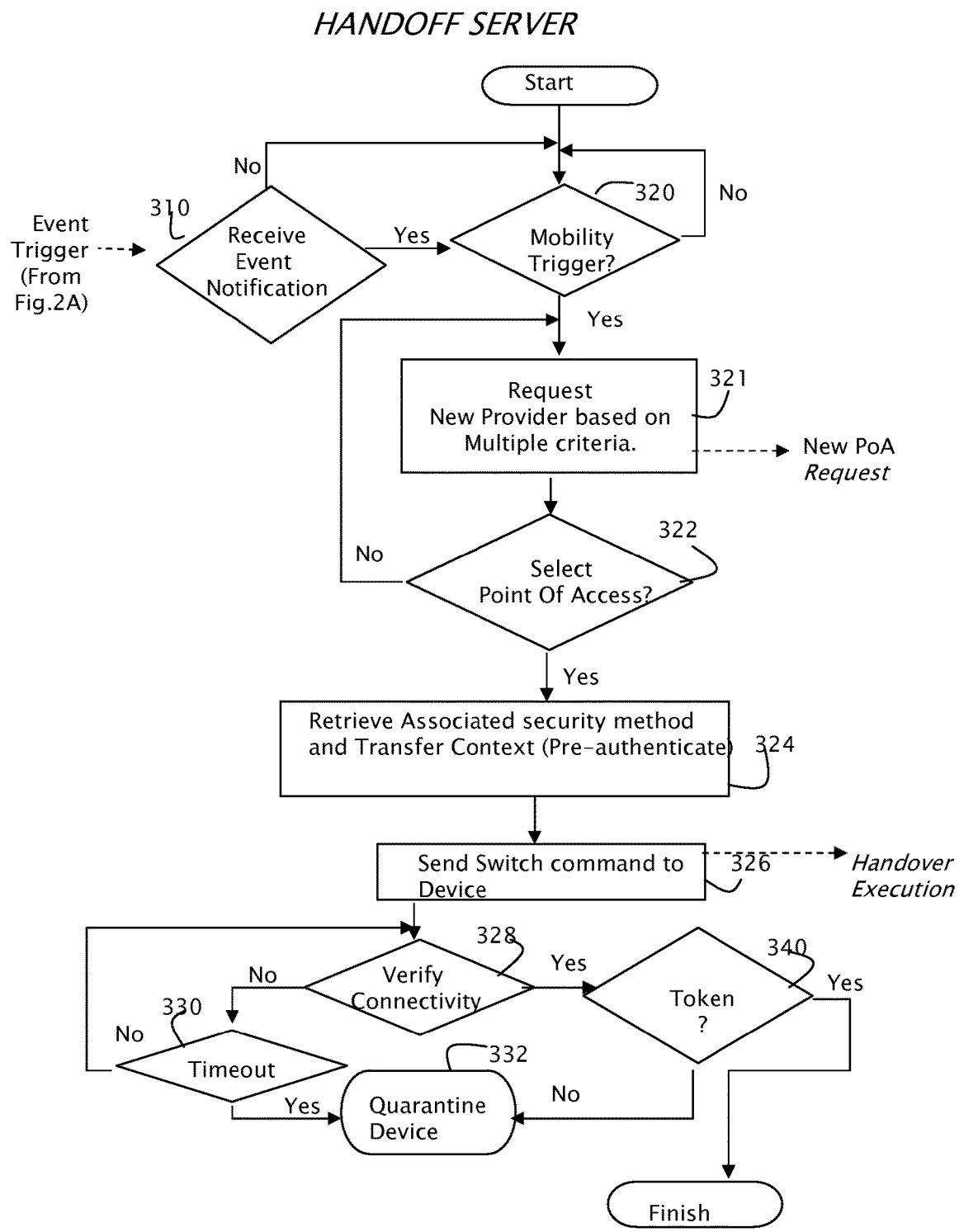
FIG. 3 is a flow diagram illustrating exemplary steps that may be performed by a handoff server of the present invention.

Referring now to FIG. 3, the handoff server performs active stateful monitoring of all domain devices by receiving, at step 310 event triggers from domain devices. Upon the receipt of each event trigger, the handoff server determines, at step 320, whether the combination of events and state of the domain device define a mobility trigger indicating that domain device should be transitioned to a new point of network access. If so, at step 321 the handoff server requests a list of network providers based on a variety of domain device criteria, such as location, roaming agreement, security level, application services provided by the network, security mechanisms provided by the network, etc.

At step 322, the handoff server receives information from the IS and determines whether the offered networks satisfy desired criteria. If not, the process returns to step 321 and more network information is retrieved. If, at step 322, a desirable network and point of access is identified, then at step 324 a Point of Access is selected and the security mechanism(s) for the point of access are identified. It should be noted that the handoff server may take into account certain state information for the domain device when selecting a Point of Access. For example, information such as whether the domain device was internal or external to a building would affect whether the handoff server selects an 802.11 network or a carrier network.

At step 324, the domain device may be pre-authenticated, prior to the forwarding of the security mechanism(s), for example by performing one or both of validating the reachability of the domain device as well as validating the token of the domain device. The security mechanisms are then transferred over to the domain device to enable the domain device to configure itself for secure communication prior to network transition.

Although not explicitly shown, in one embodiment the handoff server, rather than forwarding the security mechanisms to the domain device, acts as a proxy for domain device, and secures communications with the new point of access by executing the security mechanisms via the gateway. With such an arrangement, authenticated domain devices with limited capabilities may still be coupled to networks having more complex security mechanisms.

At step 326, the handoff server signals the domain device to transition to the new point of access, and at step 328 monitors the transition of the device to the new network. If the domain device does not transition to a new network before timeout at step 330, then the domain device is quarantined and is not permitted to access the network. Otherwise, once the handoff server has determined that the domain device has connected to the new network, at step 340 the handoff server verifies (for example using a federation algorithm) that the domain token is valid. If the token is not valid, a potential MAC spoofing has occurred, and the domain device is quarantined at step 332. If the token is valid, then the transition of the domain device is complete.

Figure 4:
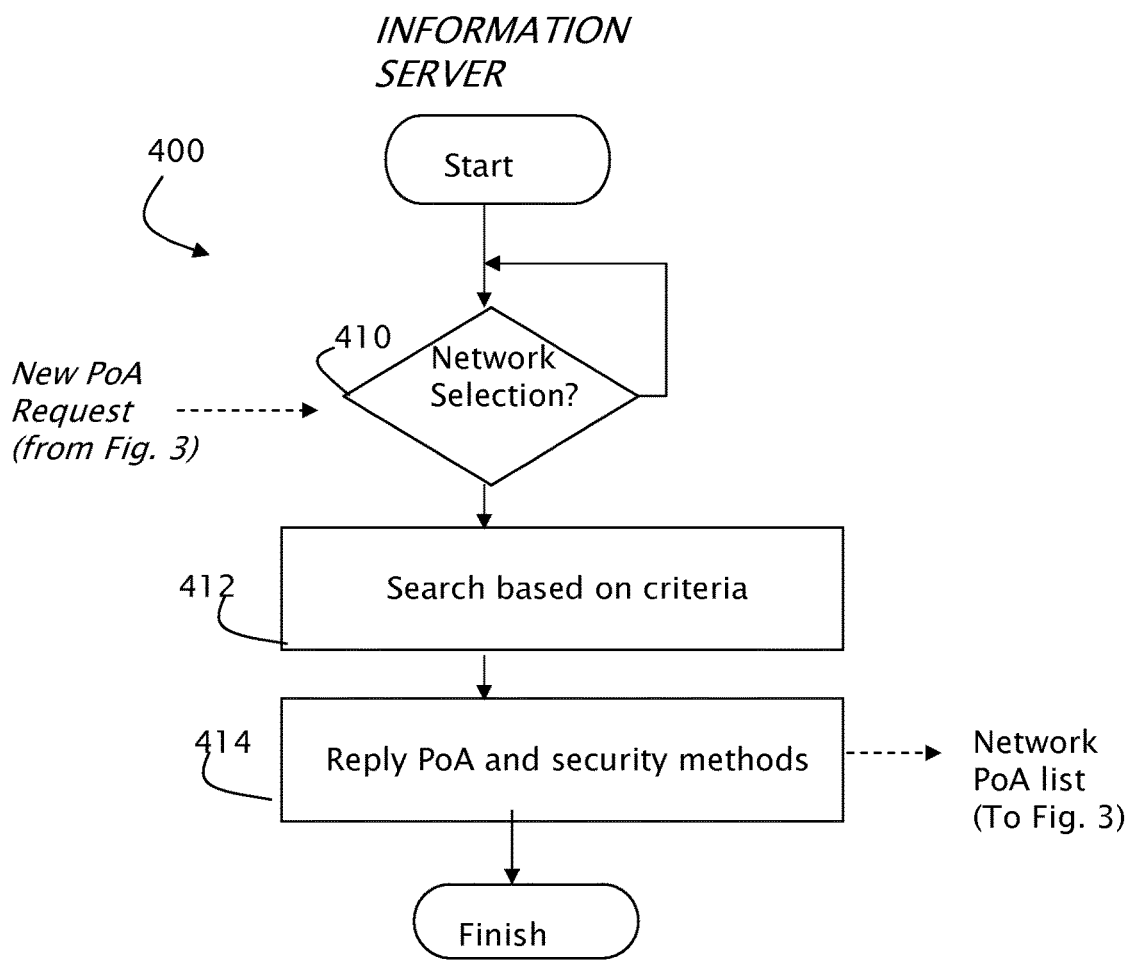
FIG. 4 is a flow diagram illustrating exemplary steps that may be performed by an Information Server to provide network information and security mechanism to the handoff server process of FIG. 3.

FIG. 4 illustrates several steps that may be performed by the Information Server as the Handoff Server executes the steps of FIG. 3. At step 510, upon receipt of a new point of access request from the handoff server, at step 412 the IS searches its database to identify networks and points of access that satisfy the criteria identified by the handoff server. At step 414, the IS returns one or more PoA for one or more networks, including the security mechanisms for each PoA. It should be noted that, as described above, there may be many layers of security in a network, and the IS forwards all security mechanisms that are required to enable the domain device to adequately access the network. For example, should the handoff server connect the domain device to an 802.11 network that includes an IPSEC gateway, the handoff server may instruct the domain device to turn on the IPSEC gateway before connecting with the point of access.

Figure 5:
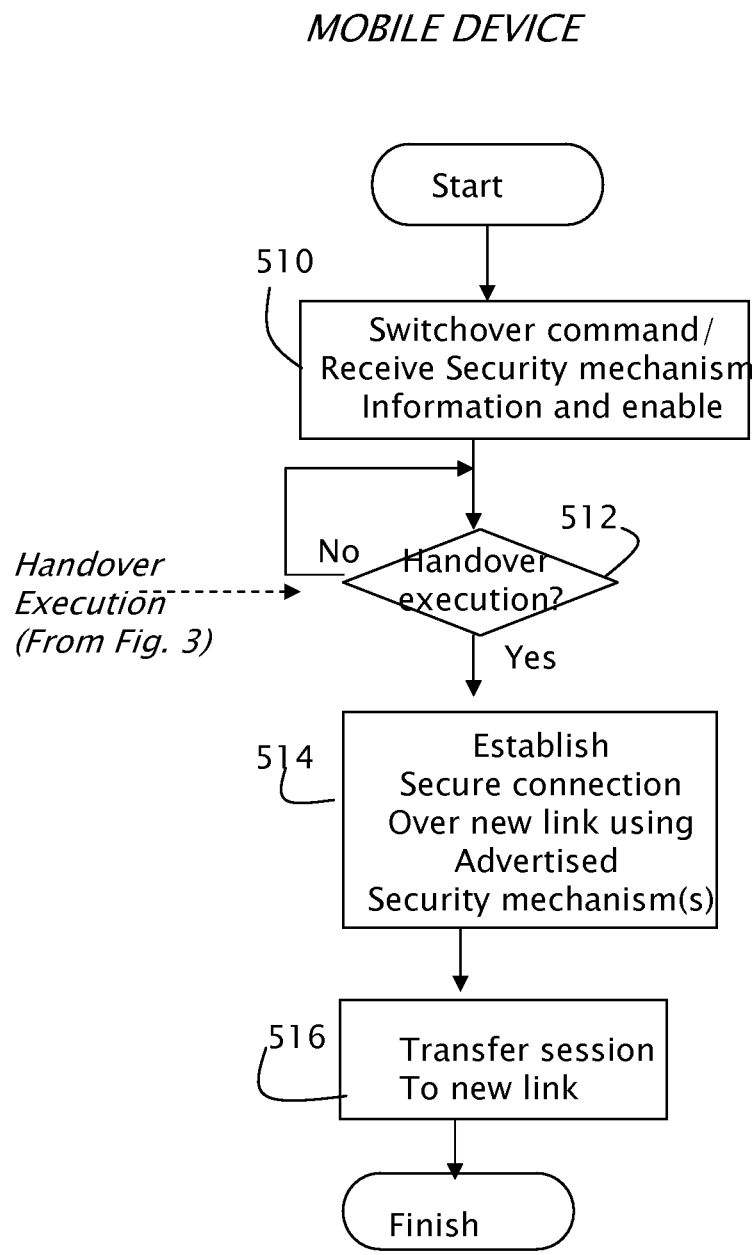
FIG. 5 is a flow diagram illustrating exemplary steps that may be performed by a domain device which receives advertised point of access and security mechanism information according to the present invention.

FIG. 5 illustrates various steps that are performed by the domain device upon receipt of a security mechanism from the handoff server. At step 510, the domain device receives a new point of access and the security mechanism(s) associated with the point of access. The domain device enables or otherwise installs information associated with the mechanism on the domain device. At step 512 the domain device awaits instruction from the handoff server to transition to the new network. When the handover instruction is received, at step 514 the domain device establishes a secure connection over the new link, and at step 516 transfers sessions to the new link.

Accordingly, a system and method has been shown and described which enables autonomic discovery of wireless network security mechanisms by mobile devices, through advertisement, deployment and stateful monitoring of domain device connectivity. Such an arrangement reduces the delays and frustrations associated with transitioning between secure networks during Media-Independent Handoffs while ensuring that networks within an administrative domain remain secure.

Having described various embodiments of the invention, it will be appreciated that many of the above figures are flowchart illustrations of methods, apparatus (systems) and computer program products according to an embodiment of the invention. It will be understood that each block of the flowchart illustrations, and combinations of blocks in the flowchart illustrations, can be implemented by computer program instructions. These computer program instructions may be loaded onto a computer or other programmable data processing apparatus to produce a machine, such that the instructions which execute on the computer or other programmable data processing apparatus create means for implementing the functions specified in the flowchart block or blocks. These computer program instructions may also be stored in a computer-readable memory that can direct a computer or other programmable data processing apparatus to function in a particular manner, such that the instructions stored in the computer-readable memory produce an article of manufacture including instruction means which implement the function specified in the flowchart block or blocks. The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions specified in the flowchart block or blocks.

Those skilled in the art should readily appreciate that programs defining the functions of the present invention can be delivered to a computer in many forms; including, but not limited to: (a) information permanently stored on non-writable storage media (e.g. read only memory devices within a computer such as ROM or CD-ROM disks readable by a computer I/O attachment); (b) information alterably stored on writable storage media (e.g. floppy disks and hard drives); or (c) information conveyed to a computer through communication media for example using baseband signaling or broadband signaling techniques, including carrier wave signaling techniques, such as over computer or telephone networks via a modem While the invention is described through the above exemplary embodiments, it will be understood by those of ordinary skill in the art that modification to and variation of the illustrated embodiments may be made without departing from the inventive concepts herein disclosed. Accordingly, the invention should not be viewed as limited except by the scope and spirit of the appended claims.

The invention claimed is:

1. A network entity comprising:
   at least one hardware processor, wherein the at least one hardware processor is configured to:
   send, via a first wireless network, a message configuring one or more event notifications on a mobile device as part of a registration process of the mobile device, where the first wireless network comprises a first wireless communications protocol, wherein the one or more event notifications comprise at least one of an application change, a link degradation, a discovery of a new network interface, or an occurrence of a reportable event;
   monitor reachability of the mobile device on the first wireless network;
   determine, in response to an event notification from the mobile device via the first wireless network, that the mobile device should transition to a second wireless network;
   validate at least one of reachability of the mobile device or a token of the mobile device;
   transmit, to the mobile device via the first wireless network, security configuration information for connection of the mobile device to the second wireless network, wherein the second wireless network comprises a second wireless communications protocol; and
   monitor the mobile device to determine that the mobile device has transitioned to a new point of attachment in the second wireless network.

2. The network entity of claim 1,
   wherein the event notification is a notification of an occurrence of an event trigger, and wherein events associated with event triggers are defined by the network entity.

3. The network entity of claim 1,
   wherein to monitor the mobile device, the at least one hardware processor is further configured to monitor an active state of the mobile device.

4. The network entity of claim 1,
   wherein the network entity is configured as a proxy gateway for the mobile device using the security configuration information.

5. The network entity of claim 1,
wherein to monitor the mobile device, the at least one hardware processor is further configured to perform stateful monitoring of a reachability of the mobile device to identify potential MAC spoofing.

6. The network entity of claim 1,
wherein the at least one hardware processor is further configured to selectively forward connectivity information and security configuration information to the mobile device prior to the mobile device connecting to the new point of attachment.

7. An apparatus comprising:
a memory; and
a processing element in communication with to the memory, wherein the processing element is configured to:
   receive, from a network entity via a first wireless network, a message configuring of one or more event notifications as part of a registration process with the network entity, where the first wireless network comprises a first wireless communications protocol, wherein the one or more event notifications comprise at least one of an application change, a link degradation, a discovery of a new wireless network interface, or an occurrence of a reportable event;
   generate instructions to transmit an event notification in response to an occurrence of at least one of the one or more event notifications;
   receive security configuration information for connection to a second wireless network, wherein the second wireless network comprises a second wireless communications protocol, wherein at least one of reachability of the apparatus or a token of the apparatus is validated by the first wireless network prior to receiving the security configuration information; and
   generate instructions to transition to a new point of attachment in the second wireless network.

8. The apparatus of claim 7,
wherein the network entity is configured to monitor reachability of the apparatus on the first wireless network.

9. The apparatus of claim 7,
wherein the network entity is configured to determine that the apparatus has transitioned to the new point of attachment in the second wireless network.

10. The apparatus of claim 7,
wherein the event notification is a notification of an occurrence of an event trigger, and wherein events associated with event triggers are defined by the network entity.

11. The apparatus of claim 7,
wherein the processing element is further configured to:
   receive connectivity information and security configuration information from the network entity prior to transitioning to the new point of attachment.

12. The apparatus of claim 7,
wherein the processing element is further configured to:
   implement a security mechanism associated with the security configuration information.

13. The apparatus of claim 7,
wherein the processing element is further configured to:
   receive, from the network entity, connectivity information and security configuration information prior to the apparatus connecting to the new point of attachment.

14. A non-transitory computer readable memory medium storing program instructions executable by a processor of an apparatus to:
   receive, from a network entity via a first network, a configuration of one or more event notifications as part of a registration process with the network entity, where the first wireless network comprises a first wireless communications protocol, wherein the one or more event notifications comprise at least one of an application change, a link degradation, a discovery of a new wireless network interface, or an occurrence of a reportable event;
   generate instructions to transmit an event notification in response to an occurrence of at least one of the one or more event notifications;
   receive a security configuration information for connection to a second wireless network, wherein the second wireless network comprises a second wireless communications protocol, wherein at least one of reachability of the apparatus or a token of the apparatus is validated by the first wireless network prior to receiving the security configuration information; and
   generate instructions to transition to a new point of attachment in the second wireless network.

15. The non-transitory computer readable memory medium of claim 14,
wherein the network entity is configured to monitor reachability of the apparatus on the first wireless network.

16. The non-transitory computer readable memory medium of claim 14,
wherein the network entity is configured to determine that the apparatus has transitioned to the new point of attachment in the second wireless network.

17. The non-transitory computer readable memory medium of claim 14,
wherein the event notification is a notification of an occurrence of an event trigger, and wherein events associated with event triggers are defined by the network entity.

18. The non-transitory computer readable memory medium of claim 14,
wherein the program instructions are further executable to:
   receive connectivity information and security configuration information from the network entity prior to transitioning to the new point of attachment.

19. The non-transitory computer readable memory medium of claim 14,
wherein the program instructions are further executable to:
   implement a security mechanism associated with the security configuration information.

20. The non-transitory computer readable memory medium of claim 14,
wherein the program instructions are further executable to:
   receive, from the network entity, connectivity information and security configuration information prior to the apparatus connecting to the new point of attachment.

* * * * *